(No Model.)
E. B. PRESTON.
HOSE FASTENER.
No. 282,467.           Patented July 31, 1883.
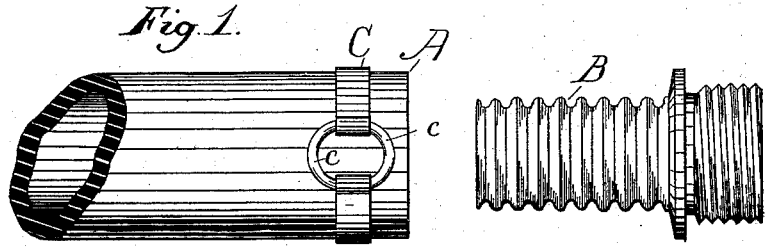
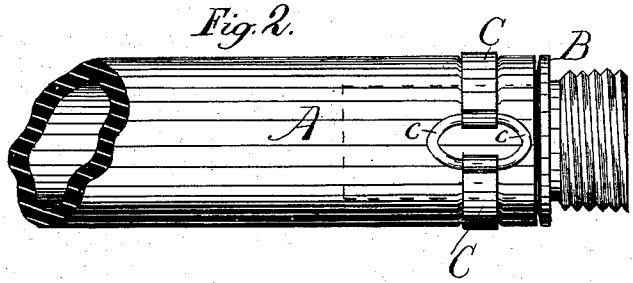
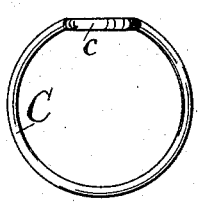 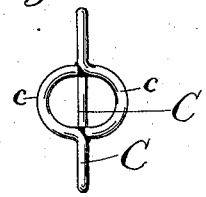
Witnesses:
T. Everett Brown
H. W. Munday
Inventor:
Everett B. Preston,
per Munday, Evarts & Adcock
his Attorneys

UNITED STATES PATENT OFFICE.

EVERETT B. PRESTON, OF CHICAGO, ILLINOIS.

HOSE-FASTENER.

SPECIFICATION forming part of Letters Patent No. 282,467, dated July 31, 1883.

Application filed February 26, 1883. (No model.)

*To all whom it may concern:*

Be it known that I, EVERETT B. PRESTON, a citizen of the United States, residing in Chicago, in the county of Cook and State of Illinois, have invented a new and useful Improvement in Hose-Fasteners, of which the following is a specification.

In the accompanying drawings, which form a part of this specification, Figure 1 is a plan view of a device embodying my invention. Fig. 2 is a similar view, showing a hose-fastener after it is compressed so as to bind the hose and coupling together and form a tight joint. Figs. 3 and 4 show a modification.

In the drawings, A represents a section of the hose; B, the coupling or connection to which it is to be secured. C is a ring or band provided with a compressible connecting ring-link, $c$, by compressing which the diameter of the ring or band C is diminished, so as to cause it to compress the hose firmly upon the coupling.

To secure the hose to the coupling by means of my improved fastener the ring C is first slipped over the end of the hose, the tail-piece of the coupling or connection inserted, and then the ring-link $c$ is flattened or compressed, as shown in Fig. 2, so as to diminish the size of the ring C and cause it to bind the hose and coupling together.

In the modified form shown in Fig. 3 the ring C is made of wire. It may be composed of two or more wires united to the ring-link $c$. The ring C may be provided with one or more ring-links $c$, or, if preferred, may be composed entirely of such links.

I claim—

1. The hose-fastener consisting of the ring C, adapted to be slipped over the end of the hose, and provided with a compressible ring-link, $c$, by compressing or collapsing of which the ring C may be tightened upon the hose, substantially as specified.

2. The combination of the hose with the coupling and a ring, C, provided with the compressible ring-link $c$, for securing the same together, substantially as specified.

EVERETT B. PRESTON.

Witnesses:
  H. M. MUNDAY,
  CHAS. B. STEACY.